United States Patent
McDonald et al.

(10) Patent No.: US 7,258,101 B1
(45) Date of Patent: Aug. 21, 2007

(54) AUTOMOTIVE CATALYST EXCESS OXYGEN REDUCTION SYSTEM

(75) Inventors: Mike M. McDonald, Macomb, MI (US); William C. Albertson, Clinton Township, MI (US); Christopher R. Graham, Lake Orion, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/386,301

(22) Filed: Mar. 22, 2006

(51) Int. Cl.
*F02D 41/12* (2006.01)
*F02D 33/02* (2006.01)

(52) U.S. Cl. ............ 123/325; 123/336; 123/402; 123/405; 123/442

(58) Field of Classification Search ........... 123/325, 123/326, 336, 337, 394, 402–405, 442, 493
See application file for complete search history.

(56) References Cited

U.S. PATENT DOCUMENTS

| 4,106,471 A * | 8/1978 | Nakajima et al. ............ 123/325 |
| 4,537,169 A * | 8/1985 | Tsuge et al. ................. 123/325 |
| 2006/0037570 A1* | 2/2006 | Hitomi et al. ............ 123/90.15 |
| 2007/0068486 A1* | 3/2007 | Rozario et al. ............. 123/306 |

* cited by examiner

*Primary Examiner*—T. M. Argenbright

(57) ABSTRACT

An excess oxygen reduction system includes a fuel cut-off condition module, an injector module, and a valve module. The fuel cut-off condition module determines whether a fuel cut-off condition exists. The injector module prevents a fuel injector from fueling a cylinder when said fuel cut-off condition exists. The valve module closes an impulse charging valve when said fuel cut-off condition exists.

15 Claims, 4 Drawing Sheets

AUTOMOTIVE CATALYST EXCESS OXYGEN REDUCTION SYSTEM

FIELD OF THE INVENTION

The present invention relates to vehicle emissions, and more particularly to a method and apparatus to reduce excess oxygen in a catalytic converter.

BACKGROUND OF THE INVENTION

During a combustion process of an internal combustion engine, fuel is oxidized and hydrogen (H) and carbon (C) combine with air. Various chemical compounds are formed including carbon dioxide ($CO_2$), water ($H_2O$), carbon monoxide (CO), nitrogen oxides ($NO_x$), unburned hydrocarbons (HC), sulfur oxides ($SO_x$), and other compounds.

Automobile exhaust systems typically include a catalytic converter that reduces the levels of CO, HC, and NOx in the exhaust gas by chemically converting these gasses into carbon dioxide, nitrogen, and water. The catalytic converter has a property known as Oxygen Storage Capacity (OSC). OSC refers to an ability of the catalytic converter to store excess oxygen when operating under lean conditions and to release oxygen when operating under rich conditions.

A vehicle may operate in a fuel cut-off mode when the vehicle is operating in an overrun condition. Overrun conditions may occur when decelerating, coasting down a hill, or when a manual transmission clutch is engaged. During the fuel cut-off mode, the engine continues to pump gases resulting in delivery of oxygen to the catalytic converter. The oxygen is stored in the catalytic converter until a maximum oxygen storage capacity is attained. When the catalyst reaches the maximum oxygen storage capacity, NOx breakthrough may occur, reducing the ability of the catalytic converter to convert NOx emissions. Thus, it is desirable to reduce the amount of oxygen stored in the catalyst when the vehicle is operating in the fuel cut-off mode.

In one method, extra fuel is delivered to the engine and into the catalyst after fuel cut-off has occurred. The oxygen is removed through catalytic action with additional HC and CO provided by the extra fuel. However, this method requires additional fuel and therefore fuel efficiency is reduced.

SUMMARY OF THE INVENTION

An excess oxygen reduction system according to the present invention includes a fuel cut-off condition module, an injector module, and a valve module. The fuel cut-off condition module determines whether a fuel cut-off condition exists. The injector module prevents a fuel injector from fueling a cylinder when said fuel cut-off condition exists. The valve module closes an impulse charging valve when said fuel cut-off condition exists.

In other features, the fuel cut-off condition module determines that the fuel cut-off condition exists when the cylinder in not to be fueled and when an engine speed is greater than an engine speed threshold. The fuel cut-off condition module reads a fuel cylinder flag to determine whether the cylinder is to be fueled. When the fuel cut-off condition exists, the fuel cut-off condition module sets an excess oxygen reduction flag to a first state. The injector module prevents the fuel injector from fueling the cylinder when the excess oxygen reduction flag is in the first state.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
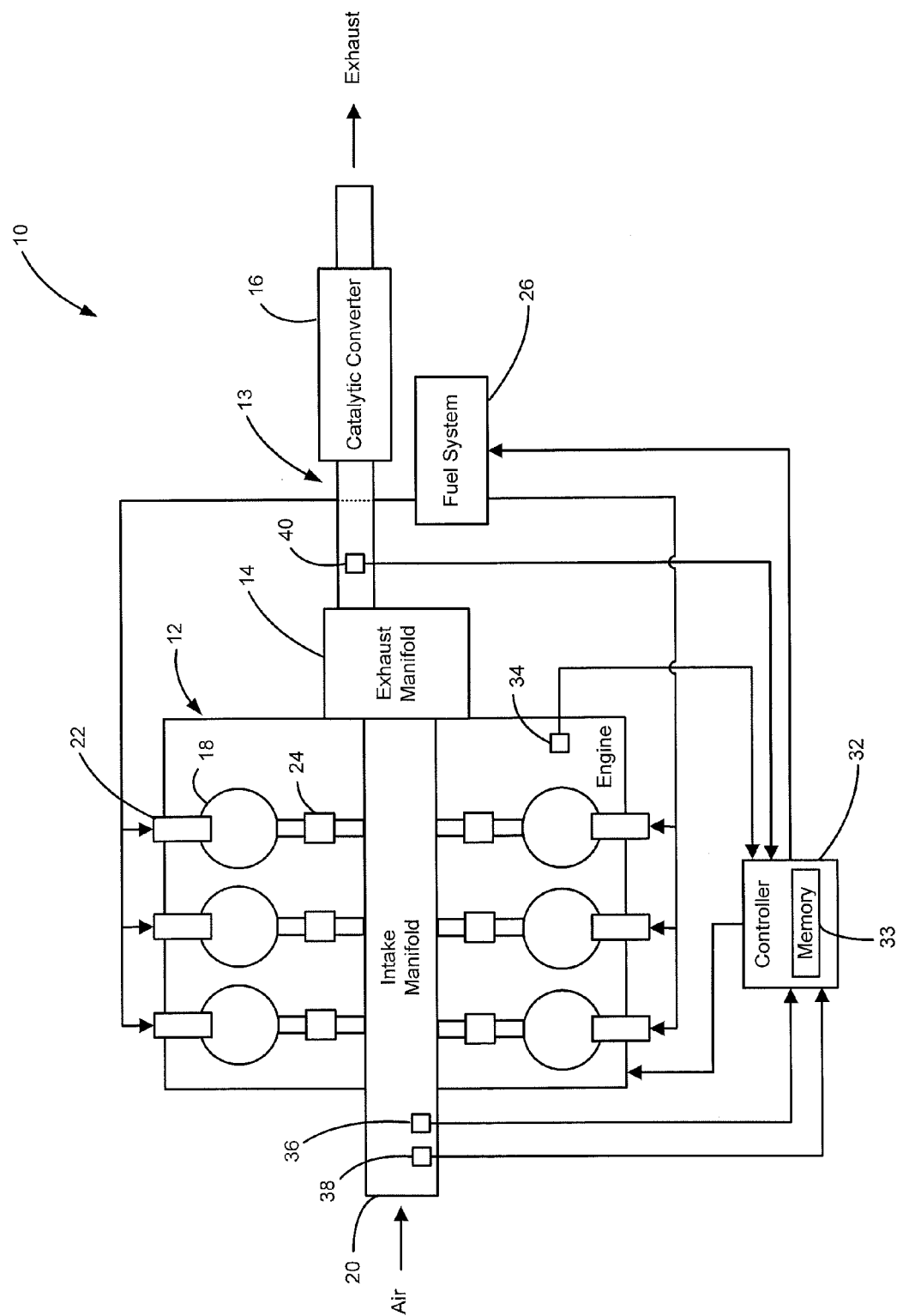
FIG. 1 is a functional block diagram of an exemplary vehicle.

The following description of the preferred embodiment(s) is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1, a vehicle 10 includes an engine 12 that outputs exhaust gases to an exhaust system 13. The exhaust system 13 includes an exhaust manifold 14 and a catalytic converter 16. The engine 12 includes N cylinders 18. Although FIG. 1 depicts six cylinders (N=6), it can be appreciated that the engine 12 may include additional or fewer cylinders 18. For example, engines having 4, 5, 6, 8, 10, 12 and 16 cylinders are contemplated. Air flows into the engine 12 through an intake manifold 20 and is combusted with fuel in the cylinders 18.

The engine 12 includes fuel injectors 22 and impulse charging valves 24 associated with each cylinder 18. In a closed position, the impulse charging valves 24 inhibit air flow from the intake manifold 20 into the associated cylinders 18. In an open position, the impulse charging valves 24 allow air flow from the intake manifold 20 into the associated cylinder 18. The fuel injectors 22 communicate with a fuel supply system 26. The fuel injectors 22 are selectively operated to inject a quantity of fuel into the respective cylinders 18. Air and fuel are combined in the cylinders 18 and are combusted to produce driving power. When the vehicle 10 is operating in a fuel cut-off condition, the fuel injectors 22 cease injecting fuel into the cylinders 18. Exemplary fuel cut-off conditions include, but are not limited to, coasting, decelerating, engine off idle, and shifting.

A controller 32 that includes memory 33 communicates with the engine 12 and various sensors discussed herein. More particularly, the controller 32 outputs control signals to the engine 12 to actuate the valves 24. An engine speed sensor 34 generates a signal based on engine speed. An inlet air temperature sensor 36 generates a signal based on inlet air temperature. An intake manifold pressure sensor 38 generates a signal based on an absolute pressure of air in the intake manifold 20. An exhaust gas oxygen sensor 40 generates a signal based on a relative exhaust gas oxygen content. The controller 32 communicates with the fuel supply system 26 and the impulse charging valves 24.

Figure 2:
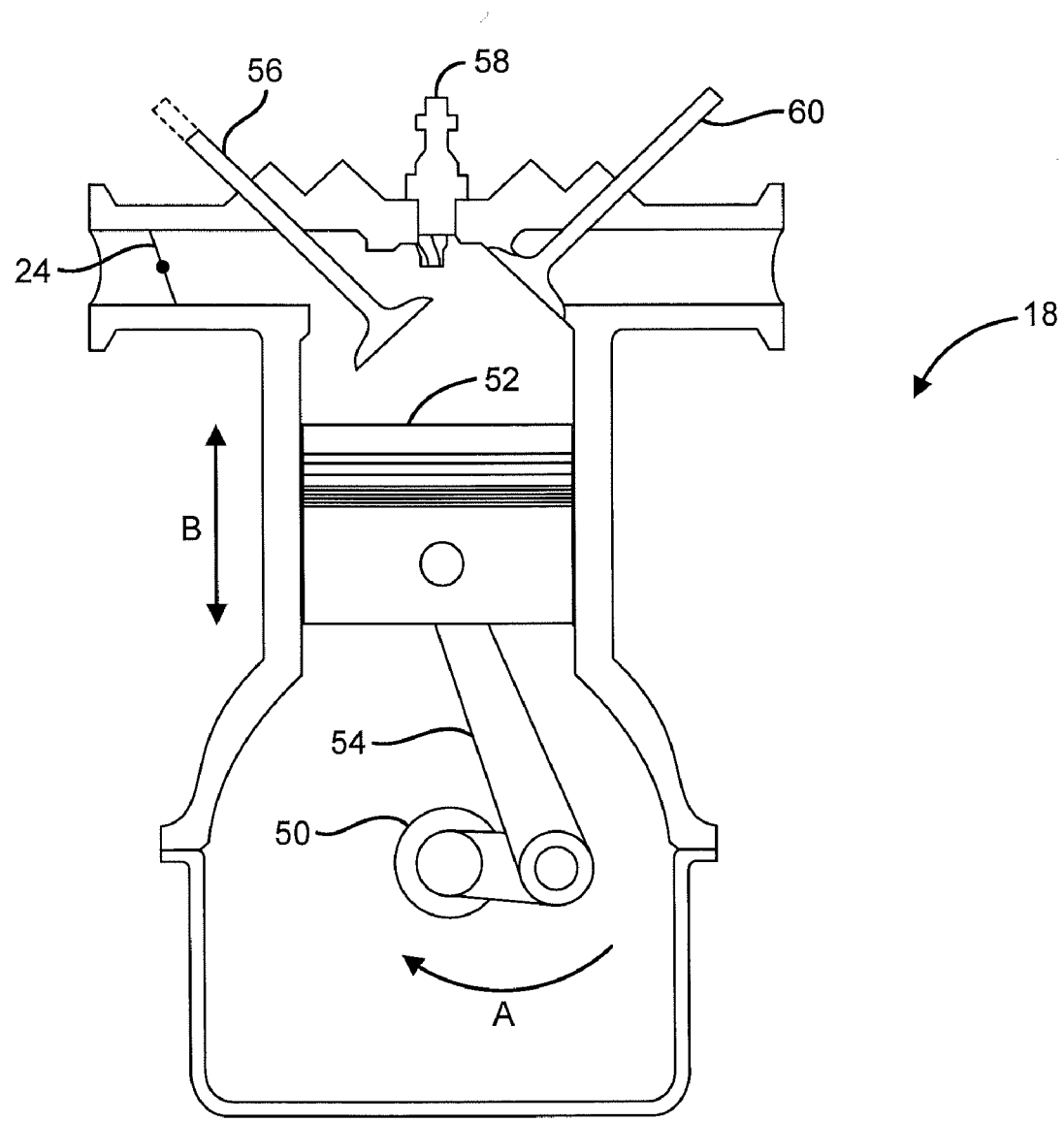
FIG. 2 is a functional block diagram of an exemplary cylinder.

Referring now to FIG. 2, during a combustion process a crankshaft 50 rotates in direction A. The crankshaft 50 is connected to a piston 52 with a connecting rod 54. As the crankshaft rotates in direction A, the connecting rod 54 moves the piston 52 up and down along path B. When the piston 52 is near the top of the cylinder 18, an intake valve 56 opens to allow air to flow into the cylinder 18. When the piston 52 is near the bottom of the cylinder 18, the intake valve 56 closes allowing the piston 52 to compress an air/fuel mixture in the cylinder 18. When the piston 52 is near the top of the cylinder 18, a spark plug 58 emits a spark to ignite the air/fuel mixture. The air/fuel mixture burns and heats the gases increasing their pressure thus driving the piston 52 downward. Just before the piston 52 reaches the bottom of the cylinder 18, an exhaust valve 60 opens allowing exhaust gases to exit the cylinder 18.

The impulse charging valve 24 is used to impulse charge the engine 12. Impulse charging is a method to increase air volume in each cylinder 18 to improve power delivery of the engine 12 at low speeds. Impulse charging can be accomplished by installing the impulse charging valve 24 in the intake manifold 20 ahead of each cylinder 18. The impulse charging valve 24 is closed while the piston 52 travels downward during the intake stroke of the combustion process, creating a high vacuum by sealing the cylinder 18. Just before the piston 52 reverses direction to begin the compression stroke, the impulse charging valve 24 opens and a large pressure drop that has been created draws air in at the speed of sound. The sharp intake of air bounces off the piston 18 crown creating a counter wave flowing back toward the top of the cylinder 18. The impulse charging valve 24 closes before the high-pressure wave can escape resulting in an increased volume of air in the cylinder 18.

Figure 3:
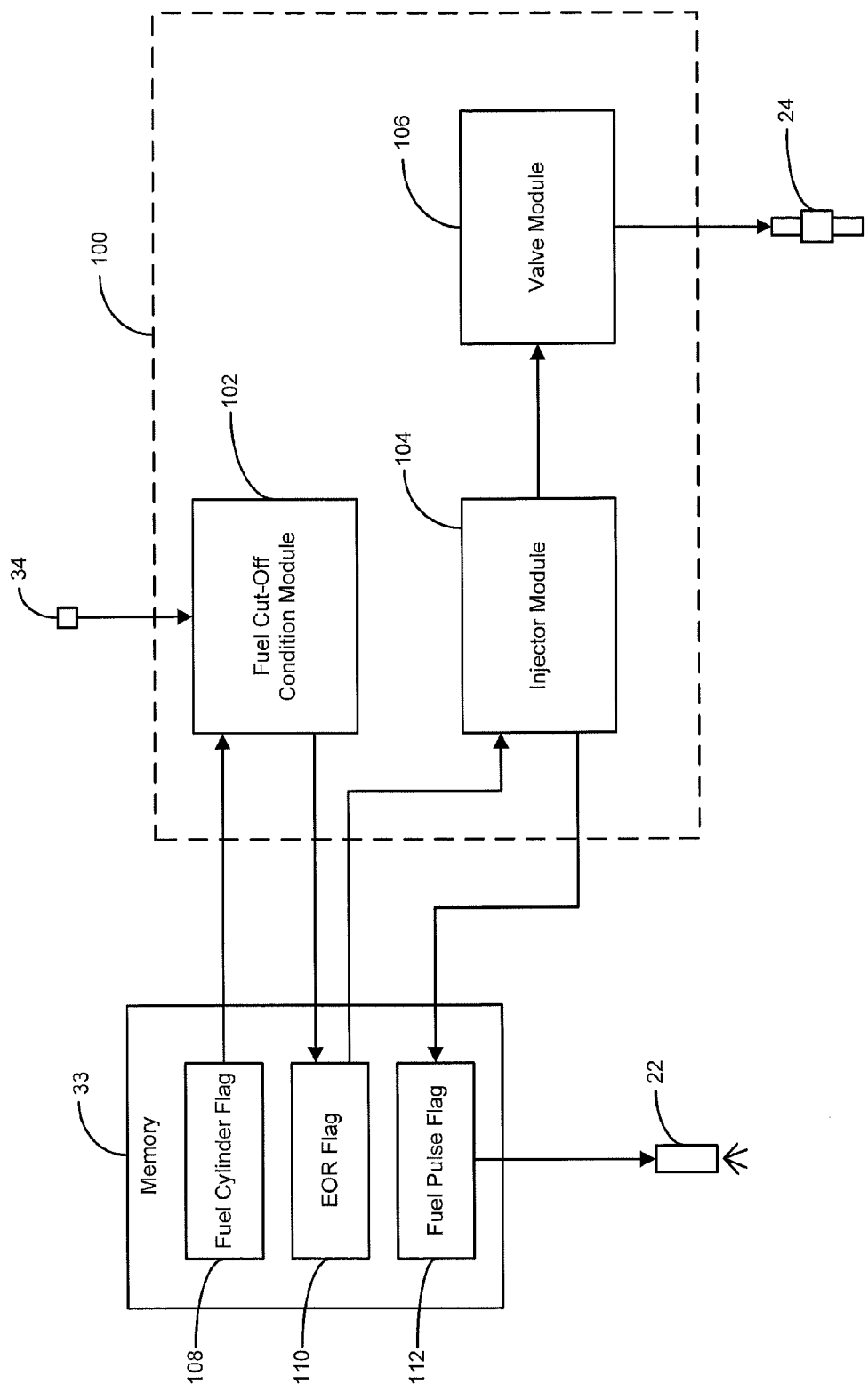
FIG. 3 is a functional block diagram of an excess oxygen reduction system according to the present invention.

Referring now to FIG. 3, an excess oxygen reduction system 100 includes a fuel cut-off condition module 102, an injector module 104, and a valve module 106. The fuel cut-off condition module 102 determines whether the fuel cut-off condition has occurred. More specifically, the fuel cut-off condition module 102 communicates with the engine speed sensor 34 and a fuel cylinder flag 108 that is located in memory 33. The fuel cylinder flag 108 is typically set when the cylinder 18 is to be fueled. However, it is appreciated that the fuel cylinder flag 108 may operate in reverse and thus may be cleared when the cylinder is to be fueled.

When the speed of the engine 12 is greater than an engine speed threshold and the fuel cylinder flag 108 is not set, the fuel cut-off condition module 102 sets an excess oxygen reduction (EOR) flag 110 in memory 33. In a preferred embodiment, the engine speed is greater than a threshold indicating that the engine is running. The EOR flag 110 designates that the excess oxygen reduction system 100 has been enabled. Although the EOR flag 110 is set in this example, it is appreciated that the EOR flag 110 may operate in reverse and thus may be cleared rather than set.

When the EOR flag 110 has been set, the injector module 104 clears a fuel pulse flag 112 to ensure that the cylinder 18 is not being fueled. When the fuel pulse flag 112 is cleared, the fuel injector 22 discontinues delivering fuel to the cylinder 18. Although the fuel pulse flag 112 is cleared in this example, it is appreciated that the flag may operate in reverse and thus may be set to prevent the fuel injector 22 from delivering fuel. After the fuel injector 22 has been disabled, the valve module 106 closes the impulse charging valve 24 to prevent oxygen from being pumped into the engine 12 and consequently the catalytic converter 16.

The fuel cut-off condition module 102 determines whether the fuel cut-off condition has ceased when the fuel cylinder flag 108 is not set. When the fuel cut-off condition has ceased, the fuel cut-off condition module 102 clears the EOR flag 110. After the EOR flag 110 is cleared, the injector module 104 sets the fuel pulse flag 112. When the fuel pulse flag 112 is set, the fuel injector 22 is allowed to deliver fuel to the cylinder 18 and the valve module 106 allows the impulse charging valve 24 to operate normally in a coordinated manner allowing air to flow into the cylinder with appropriately scheduled fuel delivery.

Figure 4:
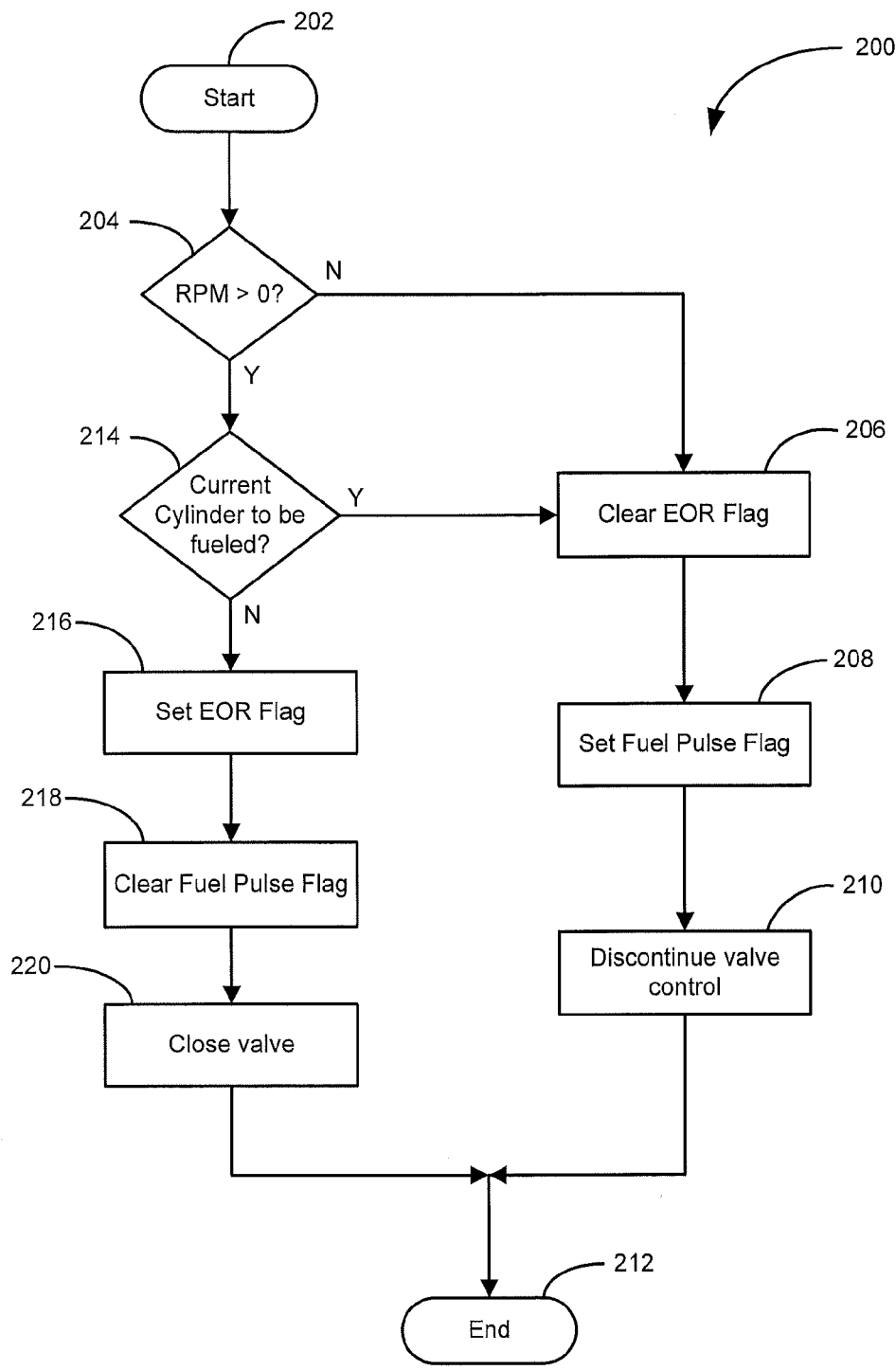
FIG. 4 is a flow chart illustrating exemplary steps executed by the excess oxygen reduction system.

Referring now to FIG. 4, the excess oxygen reduction system 100 implements steps generally identified at 200. Control begins in step 202 when the vehicle 10 is started. In step 204, the fuel cut-off condition module 102 determines whether the speed of the engine 12 is greater than zero. If the speed of the engine 12 is not greater than zero, the fuel cut-off condition module 102 clears the EOR flag 110 in step 206. In step 208, the injector module 104 sets the fuel pulse flag 112 to allow the fuel injector 22 to deliver fuel to the cylinder. When the fuel pulse flag 112 has been set, the valve module 106 stops controlling the impulse charging valve 24 in step 210 and control ends in step 212.

If the speed of the engine 12 is greater than zero, the fuel cut-off condition module 102 determines whether the cylinder 18 is to be fueled in step 214. If the cylinder 18 is being fueled, the fuel cut-off condition module 102 clears the EOR flag 110 in step 206, the injector module 104 sets the fuel pulse flag 112 in step 208, the valve module 106 discontinues controlling the impulse charging valve 24 in step 210, and control ends in step 212.

If the cylinder 18 is not to be fueled, the fuel cut-off condition module 102 sets the EOR flag 110 in step 216. In step 218, the injector module 104 clears the fuel pulse flag 112 to ensure that the fuel injector 22 does not fuel the cylinder 18. The valve module 106 closes the impulse charging valve 24 to prevent oxygen from being pumped into the engine 12 in step 220 and control ends in step 212.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. An excess oxygen reduction system, comprising:
   a fuel cut-off condition module that determines whether a fuel cut-off condition exists;
   an injector module that prevents a fuel injector from fueling a cylinder when said fuel cut-off condition exists; and
   a valve module that closes an impulse charging valve when said fuel cut-off condition exists.

2. The system of claim 1 wherein said fuel cut-off condition module determines that said fuel cut-off condition exists when said cylinder is not to be fueled.

3. The system of claim 2 wherein said fuel cut-off condition module determines that said fuel cut-off condition exists when an engine speed is greater than an engine speed threshold.

4. The system of claim 2 wherein said fuel cut-off condition module reads a fuel cylinder flag to determine whether said cylinder is to be fueled.

5. The system of claim 3 wherein said fuel cut-off condition module sets an excess oxygen reduction flag to a first state when said fuel cut-off condition exists.

6. The system of claim 5 wherein said injector module prevents said fuel injector from fueling said cylinder when said excess oxygen reduction flag is in said first state.

7. The system of claim 6 wherein said injector module sets a fuel pulse flag to a second state to prevent said injector from fueling said cylinder when said fuel cut-off condition exists.

8. The system of claim 3 wherein said valve module closes said impulse charging valve when said fuel cut-off condition exists.

9. A method to reduce excess oxygen in a catalytic converter, comprising:
   determining whether a fuel cut-off condition exists;
   preventing a fuel injector from fueling a cylinder when said fuel cut-off condition exists; and
   preventing excess oxygen flow to the catalytic converter by closing an impulse charging valve when said fuel cut-off condition exists.

10. The method of claim 9 wherein said fuel cut-off condition exists when said cylinder is not to be fueled.

11. The method of claim 10 wherein said fuel cut-off condition exists when an engine speed is greater than an engine speed threshold.

12. The method of claim 10 further comprising reading a fuel cylinder flag to determine whether said cylinder is to be fueled.

13. The method of claim 11 further comprising setting an excess oxygen reduction flag to a first state when said fuel cut-off condition exists.

14. The method of claim 13 further comprising preventing said fuel injector from fueling said cylinder when said excess oxygen reduction flag is in said first state.

15. The method of claim 11 further comprising closing said impulse charging valve when said fuel cut-off condition exists.

* * * * *